United States Patent
Pumpe

[19]

[11] Patent Number: 5,673,468
[45] Date of Patent: Oct. 7, 1997

[54] DEVICE FOR JACKETING ELONGATED MEMBERS

[75] Inventor: Ulrich Pumpe, Minden, Germany

[73] Assignee: PRO.EFF GmbH Entwicklung von Produktions-Systemen, Minden, Germany

[21] Appl. No.: 584,245

[22] Filed: Jan. 11, 1996

[30] Foreign Application Priority Data

Jan. 11, 1995 [DE] Germany .................. 195 00 571.6

[51] Int. Cl.[6] ........................................ B23P 19/04
[52] U.S. Cl. .................. 29/33 E; 29/235; 29/241; 254/134.3 R
[58] Field of Search ............... 29/33 K, 235, 29/241, 433, 755, 782, 33 E; 254/134.3 R, 134.3 FT; 174/68.3, 135

[56] References Cited

U.S. PATENT DOCUMENTS

| | | | |
|---|---|---|---|
| 5,016,859 | 5/1991 | Zimmer | 254/134.3 R |
| 5,064,970 | 11/1991 | Bennett et al. | 29/235 X |
| 5,228,179 | 7/1993 | Fukuda et al. | 29/241 |
| 5,246,207 | 9/1993 | Horii | 254/134.4 |

FOREIGN PATENT DOCUMENTS 4359611  12/1992  Japan ........................ 29/33 E

*Primary Examiner*—William R. Briggs
*Attorney, Agent, or Firm*—Burns, Doane, Swecker & Mathis, L.L.P.

[57] ABSTRACT

A hand-held device has motor driven gears for propelling a longitudinally slit, corrugated tube along a guide track to a spreader which spreads the tube apart to enable the tube to encompass an elongated member, such as a cable, which passes through the spreader. A cutter on the device cuts the tube in a direction perpendicular to the tube axis when a sufficient length of the tube has been provided to jacket the elongated member. The cutting occurs only on the corrugation peaks (not valleys) of the tube.

16 Claims, 4 Drawing Sheets

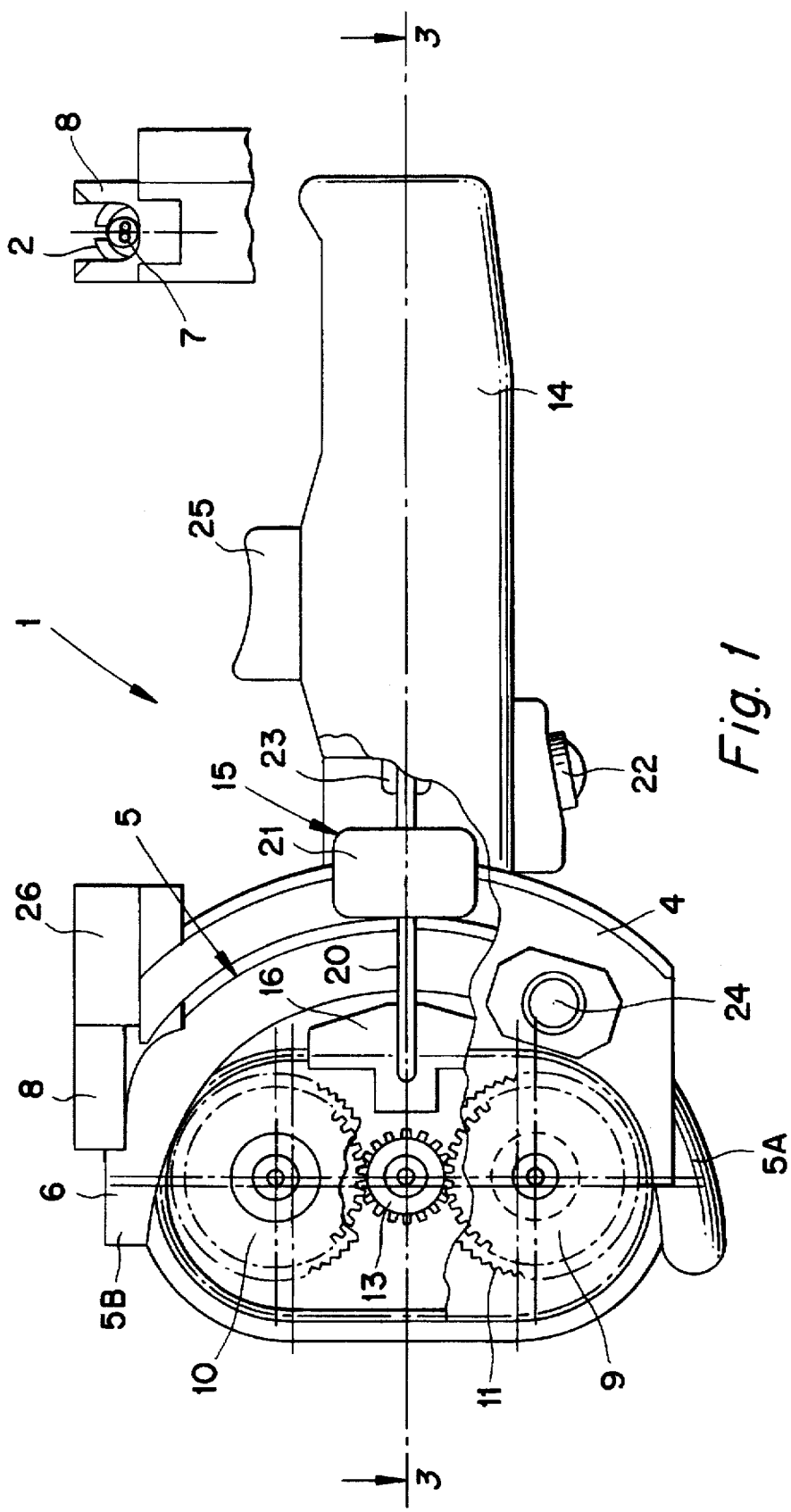

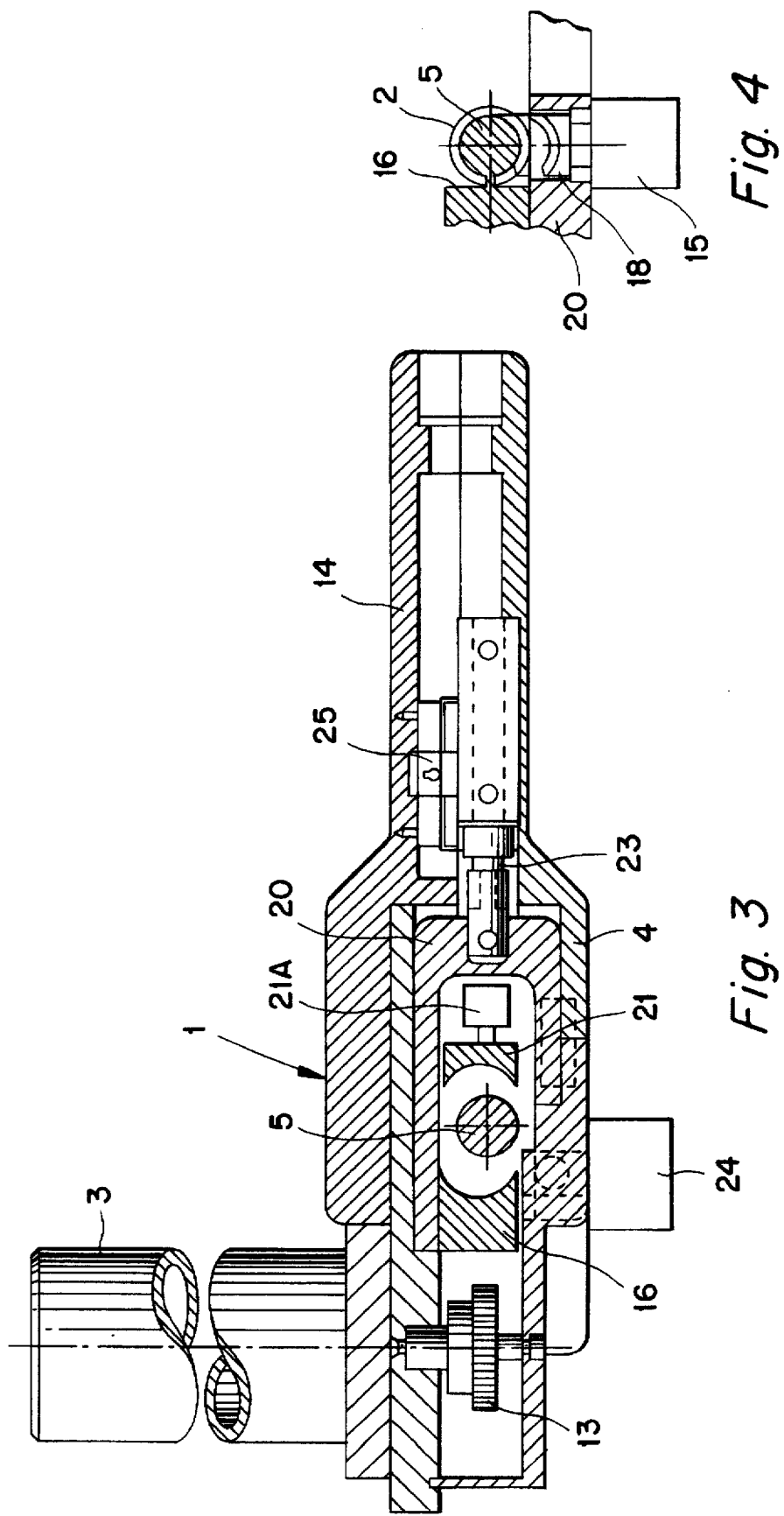

Fig. 5
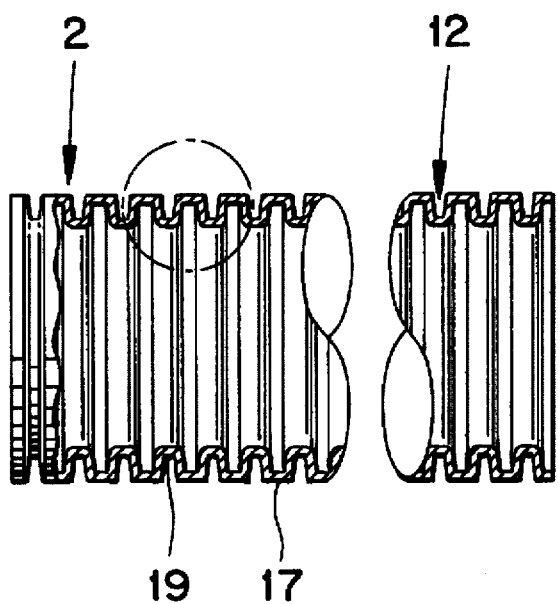
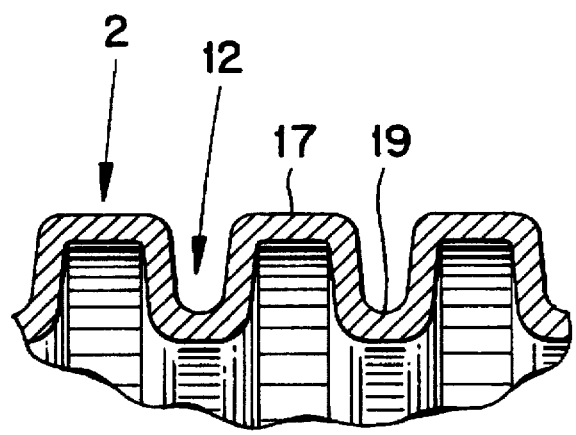
Fig. 6

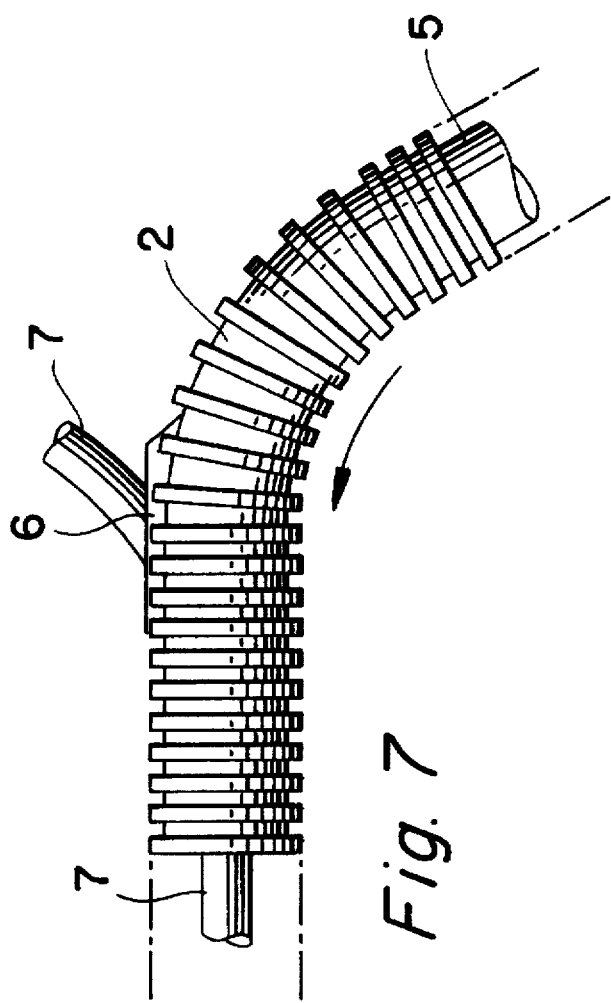
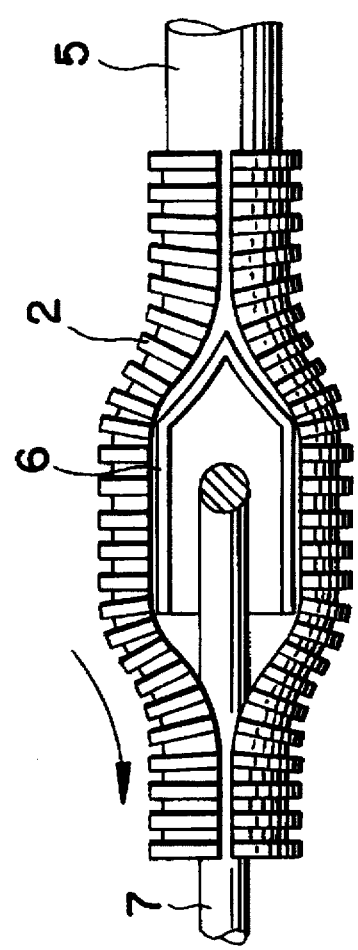
Fig. 7
Fig. 8

DEVICE FOR JACKETING ELONGATED MEMBERS

BACKGROUND OF THE INVENTION

The invention pertains to a device for the jacketing of elongated members such as cables, cable harnesses, or lines with a protective tube.

The installation of protective tubes for the jacketing of cables, cable harnesses or lines, proceeds with the cables or cable harnesses or lines being first cut to fit. These cables, cable harnesses, or lines are then laid upon so-called cable-board templates and after a determination of their length, are clamped in an orientation similar to the way the cables, cable harnesses or lines are later set in a vehicle for example. In doing so, it is particularly important that the nodes be established on the cable boards in order to lay out the branches of the cable, cable harness or lines, which nodes are in the form of plug connectors. For protection against vibrational wear or pinching of lines placed in a vehicle motor compartment, for example, these cables, cable harnesses, or lines prepared on the cable boards are subsequently encased within a jacket, for example a protective tube.

These protective tubes are installed by hand onto the individual sections of the cable branches after the cable harness has been prepared. Those tubes act, above all, as mechanical and thermal protection for the electric lines, Bowden cables and the like laid out in the motor compartment as well as for those in the spar areas.

It is worth mentioning here, that a jacketing is provided in the motor compartment to protect brake lines, Bowden cables, or the like against pinching, for example. Further, it also acts to protect against oil, or gasoline, or spraying water. The cables, cable harnesses or lines, as mocked up on the model board with all plug covers and fastening elements, are then provided with the protective jacket. This installation of the protective jacket has been done by a purely manual process, wherein the protective jacket is either pushed on, or pressed on if longitudinally split tubes are used.

The problem in the preparation of these protective jackets is that on one hand besides being a complicated handling procedure for the personnel, the installation is itself very time consuming. Additionally tools are used in the installation to mount the flexible tubes, and damage to the cables, cable harnesses or lines arises with these assisting tools which damage is irreparable afterwards and goes unrecognized.

Therefore, the objective of the invention, considering the state of the technology, is to mechanize the jacketing of cables, cable harnesses, or lines with a protective tube, whereby the handling of the device, which carefully prepares the protective tube, is easy and simple.

SUMMARY OF THE INVENTION

This objective is met according to the invention in that using a motorized drive unit the device pulls the protective tube on a guide track, wherein the protective tube is widened by a spreading collar built into the end of the grids track for insertion of the cable, cable harness, or line. The device makes possible the ability to push a protective tube mechanically onto a cable harness or a line. The protective tube is pulled from a rolled container using a motorized drive unit and led over a guide track in the device. The protective tube is spread at one point at the end of the guide track, so that an open cross section is formed which can receive the cables, harness or line. The tube is pushed onto the cable or the cable harness or line. After leaving the spreading collar, the tube recovers elastically and joins around the cable, cable harness or line. Since the circular area of the protective tube is maintained somewhat larger than the diameter of the cable, cable harness or line, the protective tube can be pushed onto the cable, cable harness or line.

The protective tube is formed of any suitable elastic or springy material which can self-close around the cable. The tube consists appropriately of a pre-slit corrugated tube, which is moved along the guide track so that the slit of the corrugated tube is widened in the vicinity of the spreading collar, whereby and the cable, the cable harness, or the line can be laid into the opened, leading tube region. A cable inlet is fastened to the spreading collar for receiving the cable, the cable harness or the line. The tubes are preferably pre-slit longitudinally, but non pre-slit tubes could be used if the device were to include a knife installed in the vicinity of the guide tack to cut the tubes lengthwise.

In an advantageous development of the invention, the motorized drive unit works in conjunction with gears, which grip with their teeth into the outer profile of the corrugated tube, to convey the protective tube by pushing it along the guide track. The teeth flanks of the gears grip in the valleys of the corrugated tube so that a coupling is produced which ensures secure transport on the guide track. The guide track extends for a half circle and has a round cross section, which ensures the conveyance of the tube section on the guide track. A gear is located on the inlet side and outlet side on the guide track which securely conveys the protective tube along the profile track. The gear located at the inlet region of the guide track first pulls the corrugated tube onto the guide track, and at the outlet side, the second gear pulls the corrugated tube along the guide track and pushes it out the end again over the spreading collar. On the basis of this gear arrangement, the corrugated tube is conveyed along the guide track, preventing the corrugated tube from catching or bending out of line. In order to handle corrugated tubes with different diameters with the device according to the invention, the possibility exists of replacing the guide tracks to adapt to different tube profile sizes.

The gears are mechanically coupled to an intermediate gear wheel to achieve rotation in the same direction. The motorized drive unit can either be located on one of the two equally turning gears, or the drive unit can also be connected to the gear wheel.

According to a particularly advantageous development of the invention, a corrugated tube cutting instrument is located in the middle of the guide track. The cutting instrument makes it possible to execute a severing process when for instance a sufficient amount of tube has been fed. The cutting instrument consists of a yoke which surrounds the guide track, and a pair of knives disposed on the opposite sides of the guide track and movable against the tube to make a safe and clean separating cut in a plane oriented perpendicular to the axis of the corrugated tube. The yoke is movably mounted in the housing of the device by a positioning cylinder located in a clamping element. With this combined effect, the cutting can be done by activation of the yoke. A release tab is provided on the clamping element which releases the yoke for displacement by the positioning cylinder. It is particularly important that the cutting instrument here grips the corrugated tube such that the knife of the cutting instrument only cuts the corrugation peak (not the valley) of the corrugated tube so that no sharp-edged end can catch and damage the protective lining of the cable, cable harness or line during vibrations arising in the vehicle as could occur if the corrugation valleys were cut.

According to another advantageous embodiment, a length measurement instrument is coupled with a motorized drive or with the gears, which maintains pre-determined set lengths of tube. This arrangement provides the ability to trace exact lengths of, for example, tubes, jackets or the like with this device which are to be pushed onto, i.e. are to cover the respective sections of cable, cable harness or line. A stop lever is located at the cable feed position whose measure corresponds to the length to be cut so that the residual length of the corrugated tube reaches the cable node or branch. Accordingly, the cutting instrument is activated before the end of the tube actually reaches the nodes or the branches. The length of the tube still in the device then corresponds exactly to the remaining length which is necessary in order to obtain a complete jacketing of the section of cable, cable harness, or line up to the branch or node.

BRIEF DESCRIPTION OF THE DRAWINGS

A preferred embodiment of the invention is explained in more detail with the help of FIGS. 1 through 8, wherein:

FIG. 1: A partial sectioned side view of the jacketing device according to the invention;

FIG. 2: A detailed view from the end of the cable feed arrangement;

FIG. 3: A sectioned schematical section taken along section line 3—3 in FIG. 1;

FIG. 4: A detail view of the clamping arrangement for the protective tube;

FIG. 5: A partial sectioned side view of the corrugated tube;

FIG. 6: A detail view of the profile of a corrugated tube according to FIG. 5;

FIG. 7: A fragmentary side elevational view of an outlet end of a guide track as a tube is being spread and inserted around an elongated member; and FIG. 8: A top plan view of FIG. 7.

DETAILED DESCRIPTION OF A PREFERRED EMBODIMENT OF THE INVENTION

FIGS. 1–4, 7, and 8 depict a hand-held device 1, which jackets elongated members 7 such as cables, cable harnesses, or lines (see FIGS. 7 and 8) with a protective tube 2, as for example represented in FIGS. 5 and 6. Device 1 prepares this protective tube 2 in that the device 1 pushes the protective tube 2 onto one or more stationary elongated members 7, by a motorized unit 3, as seen in FIG. 3, where the motorized unit 3 is attached to the device housing 4 and is controlled by a switch 25. The device 1 pulls the protective tube 2 onto the bottom end 5A of a guide track 5 using the motorized unit 3. On the upper end 5B of the guide track, a spreading collar 6 is built in, which widens the longitudinally slit protective tube 2 such that the tube can be inserted around an elongated member 7 as seen particularly in FIGS. 2, 7 and 8.

The protective tube 2 is pushed along the guide track 5 onto the elongated member 7 by the motorized unit 3. The device can be moved along the member 7 as that occurs. The protective tube 2 consists of a pre-slit corrugated tube such as is represented in particular detail in FIGS. 5 and 6. In what follows, this will be covered in more detail. The use of non-slit protective tubes 2 is allowed, if a longitudinal cutting instrument (not shown) is provided on the device which slits the protective tube lengthwise. However, the preferred embodiment disclosed herein employs only pre-slit tubes.

As seen in FIG. 1, an inlet 8 for an elongated member 7 is disposed adjacent the upper end of the guide track 5 on the spreading collar 6. This inlet 8 is configured, according to the end view in FIG. 2, such that it forms a U open upwards (see FIG. 2) so that the elongated member 7 can be inserted from the top into the inlet 8. The spreading collar 6 is located beneath the inlet 8, the width of which approximately conforms to the opening width of the opening of the inlet 8. In this way, an enlarging cross section of the slitted protective tube 2 is developed by the collar 6 into which the elongated member 7 can become disposed when the protective tube 2 is pushed underneath the inlet 8 by the motorized unit 3.

The guide track 5 is constructed in profile as a semi-circle (see FIG. 1), and its cross section is round (see FIG. 3) in order to receive and convey the hollow protective tube 2. As seen from the side view of FIG. 1, the motorized unit 3 drives gears 9 and 10 whose teeth engage the corrugations 12 of the corrugated tubes to convey the protective tube 2 by pushing it along the guide track 5.

To convey the protective tube 2, a gear 9 is located adjacent the intake (bottom) side and a gear 10 adjacent the outlet (upper) side of the guide track 5. Between the gears 9 and 10, a gear wheel 13 is arranged which is constructed likewise as a gear which couples them together mechanically. On the basis of this arrangement of the gear wheel 13, the two gears 9 and 10 each have the same turning direction with the same velocity so that the protective tube 2 is pulled onto the guide track 5 on the intake side and is pulled back again to the circular shape of the guide track 5 on the outlet side in the vicinity of the spreading collar 6. FIG. 3 shows in particular that the motorized unit 3 is connected to gear wheel 13, but the motorized unit 3 can be connected to any of the particular gears 9 or 10 in order to convey the protective tube 2 over the guide track 5.

A manual gripping handle 14 is built into the housing 4 with which the device 1 is held and manipulated. When a sufficient amount of the elongated member 7 has been jacketed, it is necessary to sever the tube in a direction perpendicularly to its axis. Located in the gripping element 14 and housing is a cutting assembly comprising knives 16, 21 which sever the corrugated tube 2. The knives 16, 21 can have straight or semi-circular shapes. This severing of the tube occurs in a direction perpendicular to the tube axis and takes place only on the corrugation peaks 17 (i.e. not on the valleys 19). This is extremely important in order that no so-called friction edges on the cut tube ends touch the sleeve of the elongated member 7. The cutting assembly grips the profile of the corrugated tube by means of jaws 18 mounted on legs of a yoke 20 such that the jaws press into the corrugation valleys 19 whereupon the corrugation peak 17 comes into alignment with the knives. An actuator 15 moves each jaw against the tube. Each knife cuts through one-half of the circumference of a peak 19.

The knives 16, 21 are movable toward and against the tube 16. The knife is moved by an actuator 21A, and the knife 16 is moved by the yoke 20. The yoke 20, which surrounds the guide track 5 is affixed to knife 16. To implement the cutting, which is activated by means of switch 22 on the gripping handle 14, a positioning cylinder 23 is mounted shiftably in the housing of the device 1, in the gripping handle 14 in this case. This positioning cylinder is connected to the yoke 20 which is located in the middle of the guide track 5. Yoke 20 has two functions, i.e., moving the knife 16 and gripping the side of the corrugated tube 2 (via clamps 18) such that the corrugation valleys 19 are shifted on the guide track 5 (because of the flexibility of the tube)

such that the corrugation peaks 17 come into alignment with knives 16 and 21. The actuators 15, 21A and 23 are all activated by the switch 22. Thus a clean separation cut on the plane of the corrugation peak 17 is accomplished. The motor 3 will be deactivated when the cutting step is to be performed so that the tube stops.

As seen in FIG. 3, a stop 24 is located across from the motorized unit 3 on the housing wall of device 1, which prevents a run-out or run-on of the motorized unit 3 after release of button switch 25, thereby ensuring a safe cutting process. With this, a possible crushing or straining of the protective tube 2 between the two gears 9 and 10 can be prevented.

According to another advantageous development of the invention, the motorized unit 3 or the two gears 9 and 10 is connected to a length measuring instrument not represented in detail, which maintains pre-determined desired lengths. Thus, exact lengths of the tube 2 can be traced with the length measurement instrument. For example, in order to run the corrugated tube or protective tube such that it reaches a branch or a node in cables, cable harnesses, or lines 7, the invention provides a stopping lever 26 on the inlet 8 located so that when the lever reaches a node or branch of the cable, the tube 2 can be severed with the knowledge that a sufficient length of tube remains on the guide track to reach the node or branch. Here, the device 1 is run until the stopper 26 reaches the node or the branch on the member 7, and then the tube is cut so that about half of the guide track 5 corresponds to the length of the protective tube 2 necessary for the tube to reach the node or branch.

Device 1 represents a so-called hand device which can be driven either electrically or with compressed air. This device could instead be constructed as a firmly anchored device, where for example a cable is inserted from above and the protective tube 2 is unrolled from a roll (not described here) from below, in order to jacket in this way endless lengths of cables, cable harnesses or lines 7.

After the slit and separated tube 2 has been inserted around the stationary elongated number 7, the tube self-closes around the member 7 due to the inherent elasticity of the tube.

Although the present invention has ben described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Apparatus for the jacketing of an elongated member with a hollow protective tube, comprising:
   a housing;
   a guide track on the housing, the guide track having an inlet end and an outlet end, the guide track configured to receive a protective tube;
   a motor-driven mechanism for propelling the tube along the guide track from the inlet end to the outlet end; and
   a spreading collar arranged adjacent the outlet end of the guide track for spreading the tube to separate longitudinally slit sections of the tube to enable the tube to be inserted around an elongated member extending through the spreading collar.

2. The apparatus according to claim 1, wherein the jacketing is effected with a corrugated tube, the motor-driven mechanism comprising at least one driven gear having teeth engage corrugations in the tube to propel the tube.

3. The apparatus according to claim 2, wherein there are two driven gears disposed at the inlet and outlet ends, respectively.

4. The apparatus according to claim 3, wherein the motor-driven mechanism includes a motor for driving both gears.

5. The apparatus according to claim 4, wherein the motor-driven mechanism includes an intermediate gear connected to both driven gears and to the motor.

6. The apparatus according to claim 1, wherein an inlet element is mounted to the housing for guiding the elongated member.

7. The apparatus according to claim 1, wherein the guide track extends in a generally semi-circular path from the inlet end to the outlet end.

8. The apparatus according to claim 7, wherein the guide track has a circular cross sectional shape.

9. The apparatus according to claim 1, further including a cutting mechanism mounted on the housing for severing the tube in a direction perpendicular to a longitudinal axis of the tube.

10. The apparatus according to claim 9, wherein the cutting mechanism is located substantially midway along the guide track.

11. The apparatus according to claim 9, wherein the jacketing is effected with a corrugated tube, the corrugations having peaks and valleys, the cutting mechanism arranged to sever the tube only along a corrugation peak thereof.

12. The apparatus according to claim 9, wherein the cutting mechanism comprises knives disposed on opposite sides of the guide track being movable toward the guide track.

13. The apparatus according to claim 12 including a movable yoke connected to one of the knives.

14. The apparatus according to claim 13. including a positioning cylinder for moving the yoke.

15. The apparatus according to claim 1, wherein the apparatus is hand-held and the housing includes a manual gripping handle.

16. The apparatus according to claim 9, further including a stop mounted on the housing for indicating a point on the elongated member which can be covered by a portion of the tube extending up to the cutting mechanism.

* * * * *